United States Patent [19]
Michaud et al.

[11] 3,933,755
[45] Jan. 20, 1976

[54] MELAMINE, FORMALDEHYDE, THIOUREA AND DIOL ETHER THERMOSETTING RESIN AND METHOD OF PREPARING THE SAME

[75] Inventors: Horst Michaud; Josef Seeholzer, both of Trostberg; Ludwig Pentzel, Tacherting; Josefa Mangs, Trostberg, all of Germany

[73] Assignee: Suddeutsche Kalkstickstoff-Werke AG, Trostberg, Germany

[22] Filed: May 22, 1974

[21] Appl. No.: 472,152

Related U.S. Application Data

[63] Continuation of Ser. No. 387,444, Aug. 10, 1973, abandoned, which is a continuation of Ser. No. 130,458, April 1, 1971, abandoned.

[30] Foreign Application Priority Data

June 2, 1970 Germany.............................. 2027085

[52] U.S. Cl. ..... 260/67.6 R; 260/29.4 R; 260/69 F; 428/530
[51] Int. Cl.² .................. C08G 12/32; C08G 12/38
[58] Field of Search .............................. 260/67.6 R

[56] References Cited
UNITED STATES PATENTS

| | | | |
|---|---|---|---|
| 2,197,357 | 4/1940 | Widmer et al. ................. | 260/67.6 R |
| 2,329,651 | 9/1943 | Powers........................ | 260/67.6 R X |
| 2,358,276 | 9/1944 | Hodgins et al. ................. | 260/67.6 R |
| 2,454,495 | 11/1948 | Widmer et al. ............ | 260/67.6 R X |
| 2,456,568 | 12/1948 | Scott et al...................... | 260/67.6 R |
| 2,839,484 | 6/1958 | Renner........................ | 260/67.6 R X |
| 3,479,247 | 11/1969 | Bonzagni.................... | 260/67.6 R X |
| 3,488,310 | 11/1970 | McCombs.................. | 260/67.6 R X |
| 3,501,429 | 3/1970 | Bonzagni.................... | 260/67.6 R X |

Primary Examiner—Howard E. Schain
Attorney, Agent, or Firm—Hans Berman

[57] ABSTRACT

A thermosetting resin useful for attaching decorative paper facings to chipboard and like cellulosic panels is prepared by condensation of melamine with thiourea, formaldehyde, and a diol ether, up to one half by weight of the melamine being capable of being replaced by urea without seriously effecting the quality of the resin.

3 Claims, No Drawings

MELAMINE, FORMALDEHYDE, THIOUREA AND DIOL ETHER THERMOSETTING RESIN AND METHOD OF PREPARING THE SAME

This is a continuation of application Ser. No. 387,444, filed Aug. 10, 1973 Now Abandoned which in turn is a continuation of aplication Ser. No. 130,458, filed Apr. 1, 1971, and now abandoned.

This invention relates to thermosetting synthetic resins, their preparation, and their use, and particularly to a resin of the melamine-formaldehyde type suitable for securing paper facings to panels of cellulosic material, particularly chipboard and like panels of agglomerated, particulate, cellulosic material.

It is known to provide chipboard panels with decorative paper facings by impregnating the facing paper with a thermosetting synthetic resin, and attaching the impregnated paper to faces of the panels at elevated temperature and pressure.

Such coated panels are being produced on an industrial scale, and melamine-formaldehyde resins are being used as adhesives. The panels with impregnated sheets of decorative paper superimposed on their major faces are set into hydraulic presses in separated multiple layers, and the resin is cured by compressing the stack of panels and separator plates and heating the compressed stack to the necessary elevated temperature. After the coated panels are practically completely cured, the temperature, as measured at the panel surfaces, is lowered to about 50°C before the pressure is released, and the panels are removed from the press. Panels of inferior surface finish are obtained if the panels are not cooled in the press. The entire press cycle takes about 15 to 25 minutes including the periods required for heating and cooling the platens.

The known process does not permit more than 2 – 4 cycles to be performed per hour, and the production rate obtainable from the press is correspondingly limited. The amortization of the capital invested in the hydraulic equipment thus is a significant factor in determining the cost of the product.

An object of the invention is the provision of a similar coating method for essentially cellulosic panels which drastically reduces the dwell time in the press, and thereby eliminates the cost of the press equipment as a significant factor in the cost of the product.

A more specific object is the provision of a resin which permits the dwell time of the coated panels in the press to be reduced approximately by an order of magnitude, or to about one tenth of that required by conventional methods.

Yet another object is the provision of a method of making the resin.

With these and other objects in view, this invention, in one of its more specific aspects, resides in a method of making a thermosetting resin in which melamine, urea, thiourea, formaldehyde, and a diol ether of the formula $HO-(CH_2)_m-O-(CH_2)_n-OH$, wherein $m$ and $n$ are 2, 3, or 4, are reacted in an aqueous medium at pH 7.5 to 10 at a temperature of 80° to 100°C until the reaction solution so obtained is capable of being diluted with water at 20°C to solids content of 10% to 50% before the diluted solution first becomes turbid.

The use of urea in the condensation mixture is optional, and the urea may replace between 0 and 50% of the weight of the melamine so that the urea weight may be up to 100% of the weight of the melamine. The amount of the thiourea should be between 0.005 and 0.5 mole, the amount of the formaldehyde between 1.4 and 4.0 moles, and the amount of the diol ether between 0.005 and 0.5 mole. These amounts are based on a combined weight of melamine and urea equal to the weight of one mole of melamine.

A solution of the resin so obtained is used for impregnating a sheet of paper which is then superimposed on a panel, whereupon the superimposed sheet and panel are subjected in a press to a temperature and pressure sufficient to cure the resin and to attach the sheet to the panel by means of the cured resin. The solvent of the resin solution is chosen to be volatile at the curing temperature. The panel having the sheet attached thereto is transferred from the press to an ambient atmosphere while still substantially at the curing temperature.

The dwell time in the press at the curing pressure and temperature need not normally exceed 120 seconds, yet, the finished panel has a surface finish which closely approximates that of the press platens. With polished platens, a smooth, glossy surface finish is readily achieved.

Best results are obtained with resins of the invention which are condensation products of 0.47 to 1.50 mole formaldehyde per combined mole equivalent of the $NH_2$ groups in the melamine and the thiourea, or of 0.43 – 1.13 mole formaldehyde per combined mole equivalent of the $NH_2$ groups in the melamine, thiourea, and urea, if the latter is part of the condensation mixture.

Contrary to general experience with other melamine-formaldehyde resins, the urea present does not significantly impair the mechanical and chemical properties of the resin as long as the weight of the urea does not exceed the melamine weight in the condensation mixture. The urea-bearing resins of the invention are stable in contact with boiling water or hot acid dye fleets.

It is important to control the pH of the aqueous condensation mixture. Best results are usually obtained at pH 8.4 – 9. At a pH lower than 7.5, the resin condenses too fast. At a pH higher than 10, the condensation reaction is very slow, and the resin formed is discolored.

The formaldehyde may be added to the reaction mixture either as such or in the form of its aqueous solution. At least a portion of the formaldehyde may also be combined with at least a portion of the thiourea to form a precondensate which then is mixed with the other reactants. The precondenste may be either a thiourea-formaldehyde condensate or a thioureamethylol methyl ether obtained by combining methanol with the formaldehyde and thiourea. The ratio of thiourea and formaldehyde in the precondensate may vary over a wide range, best results being usually obtained with 0.5 to 4 moles formaldehyde per mole of thiourea. Preferred precondensate compositions will be described hereinafter.

The resins most useful for the intended purpose contain melamine, thiourea, formaldehyde, and diol ether in a mole ratio of 1 : 0.05–0.2 : 1.8–2.5 : 0.05–2, and may additionally contain 0.2 to 0.4 mole urea. Their aqueous solutions, as produced by condensation in an aqueous medium, should have a viscosity of 10 to 25 seconds, as measured with the German standard Ford cup having a nozzle orifice of 4 mm diameter, and all viscosities hereinbelow will be given in seconds with reference to such a cup. The preferred resin solution should have a specific gravity of 1.24 to 1.26 at 20°C and an index of refraction of 1.48 to 1.50 at the same temperature. For each mole of formaldehyde, there should preferably be a combined mole equivalent of 0.58 to 1.0 $NH_2$ group in the several other reactants.

When used for adhesively securing paper facings to panels of other material, more specifically chipboard panels and other panels of agglomerated, particulate, cellulosic material, the resins permit the dwell time in the press at elevated temperature and pressure to be reduced to 45 to 120 seconds, and the coated panels to be removed from the press while still substantially at their curing temperature, without loss of surface finish. The coated panels have a gloss and freedom from pores and other depressions equal to or superior to the corresponding properties of panels produced in much longer dwell times with conventional resins.

The hydraulic equipment is thus utilized more economically, and the cost of thermal energy required per unit amount of coated panels is greatly reduced because none of the thermal energy is lost by cooling. The panels prepared according to the invention have greater mechanical strength than those prepared by conventional methods because the panel cores are exposed to high temperature only for a very short period as compared to the methods used heretofore for curing the thermosetting resin adhesive. For equal ultimate strength, the core panels of the invention may be lighter, and thus less costly than the core panels employed in conventional processes.

The resins of the invention, while eminently useful in the manufacture of paper faced panels, are also useful in laminating other layers of fibrous material to each other, for bonding particulate cellulosic matter under heat and pressure into panels and like shapes, and ultimately for preparing shaped objects by compression molding compositions which, in addition to the resins of the invention, may, but need not, contain fillers and similar ingredients.

The following Examples are further illustrative of this invention.

Example 1

600 g Aqueous 30% formaldehyde solution (6 moles formaldehyde) were adjusted to pH 8.6 at 20°C with aqueous sodium hydroxide solution. 27 g (0.355 Mole) thiourea, 36 g (0.34 mole) diethyleneglycol, and 378 g (3 moles) melamine were stirred into the formaldehyde solution at ambient temperature. The mixture obtained was heated to 90°C and held at that temperature until a sample of the resin solution so obtained became turbid when diluted with 1.5 volumes water at 20°C. The bulk of the solution was then cooled quickly to ambient temperature (20°C), and the cooled solution had a viscosity of 17.6 seconds, a specific gravity of 1.250, and an index of refraction of 1.490. It contained 57% resin solids.

Sheets of porous, pigmented decorative paper of high acellulose content were impregnated with the resin solution to which 0.05% formamidinesulfinic acid was added as a hardener immediately prior to application. The resin solution added approximately 130% to 145% to the weight of the paper after drying, and the resin composition contained 5.0 to 5.5% (by weight) of material volatile at 160°C.

Both faces of a chipboard panel were coated with the impregnated paper, and the coated panel was placed between the polished platens of a press preheated to 160°C. The press was closed immediately, and a pressure of 20 $kg/cm^2$ was applied to the coated panel within approximately ten seconds after insertion in the press. The press was opened two minutes later, and the hot panel was withdrawn and replaced by another, identically coated panel to start a new curing cycle.

The surface of the cured, coated panel was uniformly glossy, and it compared favorably in its smoothness and the absence of pores or other undesired depressions with a panel prepared with conventional resins at low pressure and cooled in the press. Its gloss was equal or superior to that of all but the very best conventionally prepared panels, and far superior to otherwise conventional panels which are removed from the press while hot.

Example 2

600 g (6 Moles) 30% formaldehyde solution, 62 g of a thiourea-formaldehyde precondensate, and 36 g (0.4 mole) diethyleneglycol (0.4 mole) were mixed at ambient temperature (20°C). The precondensate was an aqueous 60% solution prepared from thiourea and formaldehyde in a mole ratio of 1:1 and had a viscosity of 12 seconds, a specific gravity of 1.22, and an index of refraction of 1.494. The solution so obtained was adjusted to pH 8.6 with aqueous sodium hydroxide solution, further mixed with 378 g (3 moles) melamine, and heated to 90°C.

This temperature was maintained until a sample cooled to 20°C and diluted with 1.5 volumes of water showed the first turbidity. The bulk of the resin solution was then cooled as quickly as possible. It had a viscosity of 17.3 seconds, a specific gravity of 1.250 at 20°, and an index of refraction of 1.4858 at 20°C.

The resin solution was mixed with 0.05% (by weight) formamidinesulfinic acid as a hardener and used for impregnating decorative paper of the type described in Example 1 so as to add 130 – 145% to the dried weight of the coated paper, including 5.0 – 5.5% material volatile at 160°C and mainly consisting of residual water and traces of formaldehyde.

Chipboard panels were coated with the impregnated paper sheets on both major faces, inserted into the afore-described press at 160°C and compressed between the press platens within 10 seconds after insertion with a pressure of 20 $kg/cm^2$. The press was opened after 90 seconds, and the hot, cured panels were withdrawn. They were of the same quality as the panels prepared according to the method of Example 1.

Example 3

600 g (6 Moles) aqueous 30% formaldehyde solution, 80 g of a thioureamethylol methyl ether (0.3 mole thiourea), and 18 g (0.17 mole) diethyleneglycol were mixed at 20°C. The mixture was adjusted to pH 8.6 with aqueous sodium hydroxide solution, and 378 g (3 moles) melamine were stirred into the adjusted solution.

The mixture was heated to 90°C and kept at this temperature until a sample diluted with 1.5 volumes water showed the first turbidity. The bulk of the resin solution was then cooled quickly to 20°C. It had a viscosity of 18.7 seconds, a specific gravity of 1.246, and an index of refraction of 1.495.

The thioureamethylol methyl ether was used as an aqueous 60% solution having a viscosity of 18.2 seconds, a specific gravity of 1.190, and an index of refraction of 1.525.

The resin solution was mixed with 0.05% formamidinesulfinic acid as a hardener and used for impregnating decorative paper in an amount to add 130 – 145% to the weight of the paper after drying. Volatile content was 5.0 to 5.5%, as determined by drying to equilibrium at 160°C.

A chipboard panel whose faces were coated with respective sheets of the impregnated paper was cured 90 seconds at 20 kg/cm² and 160°C, as described above, and thereafter withdrawn hot from the press.

Its gloss was even better than that of the coated panels prepared by the procedures of Examples 1 and 2.

Example 4

555 g (5.55 Moles) aqueous 30% formaldehyde solution were adjusted to pH 8.8 with aqueous sodium hydroxide solution and mixed with 350 g (2.78 moles) melamine at ambient temperature. The mixture was heated to 90°C and held at that temperature until a drop of the resulting resin solution produced a turbid cloud when dropped into water. At this stage, 40 g of the thioureaformaldehyde precondensate described in Example 2 and 40 g (0.38 mole) diethyleneglycol were added and heating was continued until a sample became turbid when mixed with 1.7 volumes water. 50 g (0.835 Mole) urea were stirred into the resin solution which was then cooled quickly to 20°C. Its viscosity was 16.3 seconds, its specific gravity 1.255, and its index of refraction 1.4859.

Paper was impregnated with the resin solution after addition of 0.05% (wt.) formamidinesulfinic acid to the latter. The amount of impregnating solution was sufficient to increase the dry weight of the paper by 130 – 145%, the volatile content being 5.0 – 5.5%. The impregnated paper sheets were applied to both faces of a chipboard panel, and the coated panel was cured between highly polished metal sheets at 160°C and 20 kg/cm² in 80 seconds.

The panel surfaces were smooth and almost as glossy as those prepared by the methods of Examples 1 and 2.

Example 5

600 g Aqueous 30% formaldehyde solution (6 moles formaldehyde), 62 g of the thiourea-formaldehyde precondensate described in Example 2, and 36 g dipropyleneglycol were mixed at ambient temperature. The solution so obtained was adjusted to pH 8.7 with aqueous sodium hydroxide solution and further mixed with 378 g (3 moles) melamine.

The resulting mixture was heated to 90°C and kept at that temperature until a sample became turbid when mixed with two volumes of water. The resin solution then was cooled to 20°C and had a viscosity of 17.2 seconds, a specific gravity of 1.249, and an index of refraction of 1.4877.

After having received a hardening addition of 0.05% formamidinesulfinic acid, the resin solution was used for inpregnating decorative paper to a dry pick-up of 130 to 145% including 5.0 – 5.5% volatile matter. A chipboard panel coated with the paper and cured in 90 seconds as described above showed good uniform gloss about equal to that produced in Examples 1 and 2 after having been taken from the hot press.

Closely similar results were obtained, when the diethyleneglycol or dipropyleneglycol was replaced by other diol ethers having up to eight carbon atoms, such as dibutyleneglycol, di-isopropyleneglycol, diisobutyleneglycol, di-tert-butylglycol, ethylpropyl glycol ether, ethylbutylglycol ether, propylbutylglycol ether, and the like.

While the invention has been described with particular reference to specific embodiments, it is to be understood that it is not limited thereto, but is to be construed broadly and restricted solely by the scope of the appended claims.

What is claimed is:

1. A thermosetting resin composition capable of bonding paper to clipboard within two minutes at a temperature of 160°C and a pressure of 20 kg/cm² when mixed with 0.05% formamidinesulfinic acid, the resulting bond between said paper and said clipboard being stable at said temperature at atmospheric pressure, said resin composition essentially consisting of a liquid condensation mixture obtained by heating melamine, formaldehyde, thiourea, and a diol ether at 80°– 100°C and pH 8.6 – 8.8 until the condensation mixture first becomes turbid at 20°C when diluted with water to a solids content of 10% – 50%, said diol ether being of the formula $HO-(CH_2)_m-O-(CH_2)_m-OH$, wherein $m$ is 2 or 3, the amount of said thiourea being 0.08 to 0.12 mole, the amount of said formaldehyde being 2 moles, and the amount of said diol ether being between 0.06 and 0.13 mole, said amounts being per mole of melamine.

2. A resin composition as set forth in claim 1, further comprising 0.2 to 0.4 mole urea per mole of said melamine.

3. A resin composition as set forth in claim 1, the specific gravity of said composition being 1.24 to 1.26 at 20°C, and the index of refraction thereof being 1.48 to 1.50 at 20°C.

* * * * *